Patented Dec. 26, 1922.

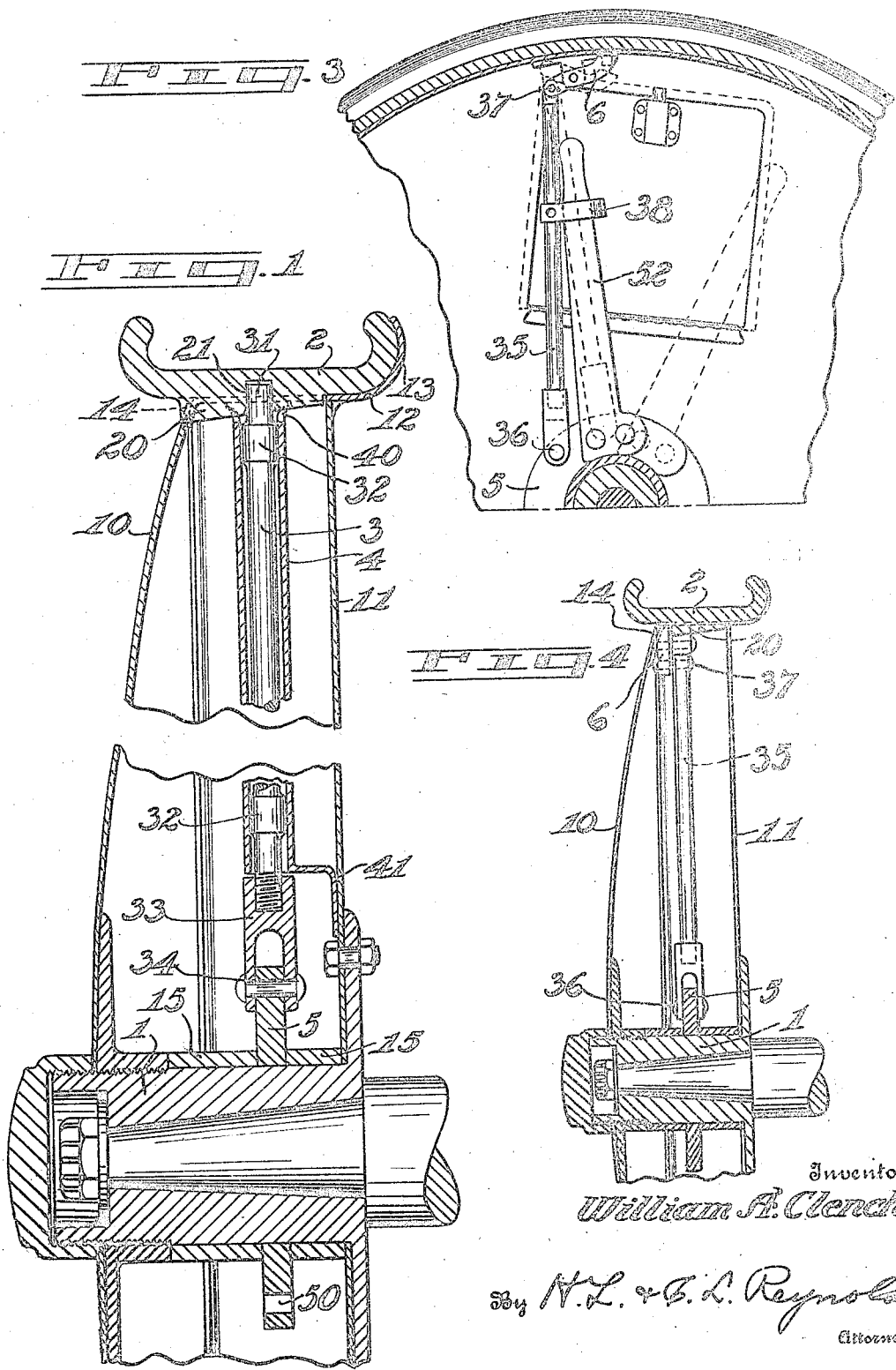

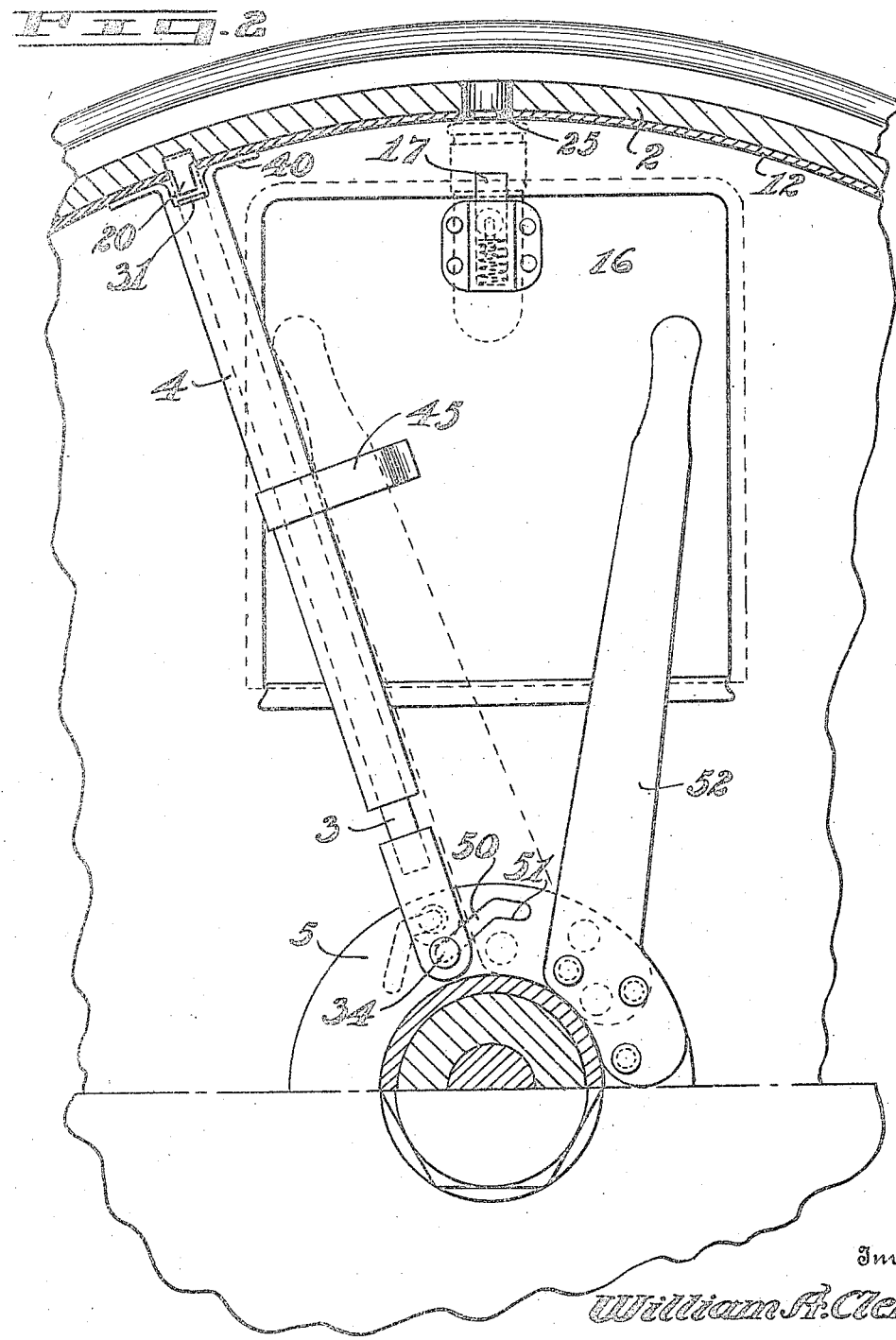

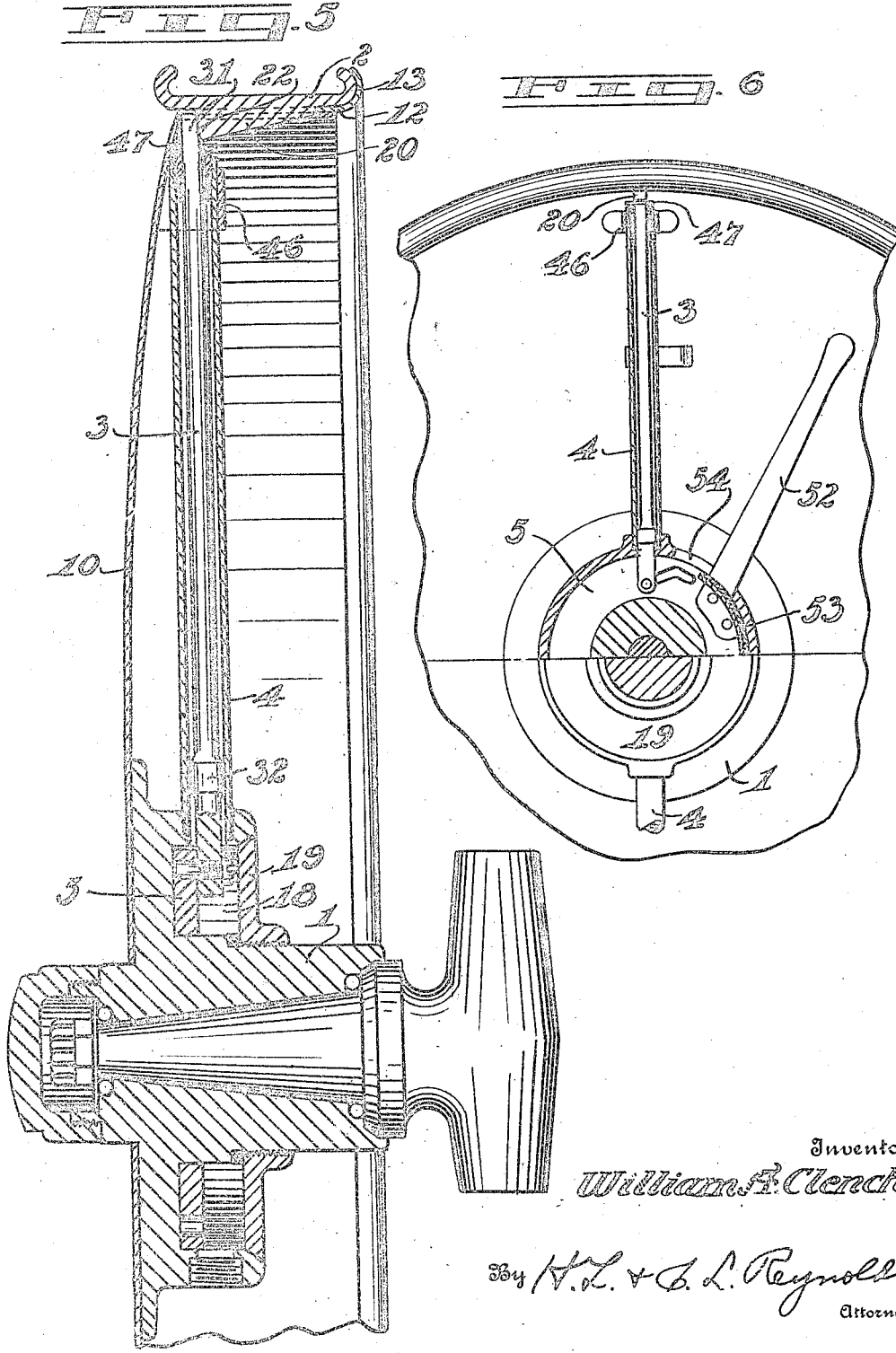

1,440,210

UNITED STATES PATENT OFFICE.

WILLIAM A. CLENCH, OF SEATTLE, WASHINGTON.

DEMOUNTABLE-RIM-LOCKING DEVICE.

Application filed May 1, 1920. Serial No. 378,114.

*To all whom it may concern:*

Be it known that I, WILLIAM A. CLENCH, a citizen of the United States of America, and resident of the city of Seattle, in the county of King and State of Washington, have invented certain new and useful Improvements in Demountable-Rim-Locking Devices, of which the following is a specification.

My invention relates to an improvement in demountable rim locking devices. My invention is particularly applicable for the purpose of locking demountable rims upon disk wheels and for that reason I shall describe it in connection with disk wheels only, although it will be evident that the same principles of construction and operation might successfully be employed in other types of wheels.

The object of my invention is to provide a device which will securely lock a demountable rim upon a disk wheel or other type of wheel, and one which may be quickly and conveniently released to take off the demountable rim.

Another object of my invention, in connection with disk wheels, is the provision of means in such a wheel for quickly and easily removing the rim from the wheel so that a tire may be replaced or demounted without removing the entire wheel.

My invention comprises those novel parts and combinations thereof which are shown in the accompanying drawings, described in the specification, and particularly defined by the claims terminating the same.

In the accompanying drawings I have shown my invention in forms which are now preferred by me.

Figure 1 is an axial section through a double disk wheel showing my device incorporated therewith.

Figure 2 is a transverse section through a portion of a double disk wheel looking toward the inner disk and illustrating my device in connection therewith.

Figure 3 is a section similar to Figure 2 showing a modified form of my device.

Figure 4 is a view similar to Figure 1 showing the same type of construction as illustrated in Figure 3.

Figure 5 is a view similar to Figure 1 showing my device applied to a single disk wheel.

Figure 6 is a section similar to Figure 2, illustrating my device in connection with a single disk wheel.

In many types of disk wheels now in use, particularly for automobiles, it is not possible to remove the tire or the demountable rim from the wheel without first removing the wheel itself. This is often a difficult and dirty job, as the weight of the entire wheel is considerable. It is much to be preferred that the rim shall be demountable from the wheel without removing the entire wheel, as the tire and rim weigh considerably less than the entire wheel, and they are more easily handled.

My device may be employed with either the single or double disk type of wheel. As I have shown it in Figures 1 to 4 inclusive it is used in connection with the double disk wheel. The outer disk 10 is preferably dished outward and is secured in any suitable manner upon the hub 1. The inner disk 11 is in like manner secured to the hub 1 and the two disks 10 and 11 are connected by a fixed rim 12, which may be secured to the upper edges of the disks, as by welding. The fixed rim 12 has an upturned flange 13 at its inner side to act as a stop for the inner side of the demountable rim 2.

The demountable rim 2 is in most respects similar to those now in use. It is provided, however, with a depending transverse key or keys 20 upon its inner face. These keys 20 are adapted to fit within slots or keyways 14 in the fixed rim, and which are spaced about the periphery of the wheel. I prefer that these slots 14 extend through the outer disk and the fixed rim, but not through the inner disk 11. I prefer also that the key 20 be so constructed that it will completely fill the slot 14 and come flush with the outside of the disk 10 in order that no dirt may collect about it. In order to assist in placing the rim 2 upon the wheel, the keys 20 should be cut slanting, so as to be smaller at their inner side than at their outer side, in order that when the valve stem of the tire is passed through the hole 25 in the fixed rim which is adapted to receive it, the entire rim and tire may be swung into position using the stem as its pivot center.

The keys 20 fitting within the slots 14 prevent rotation of the rim 2 about the fixed rim 12. In order to prevent relative axial motion between the rim 2 and the wheel I provide a locking member, which in the preferred construction consists of a bar 3 which is radially moveable in a fixed guide tube 4, and which is provided with a tip 31 adapted to engage in a hole 21 in the rim 2. This hole 21 may be drilled in the key 20 if desired, or it may consist only of an outwardly facing shoulder which will be engaged by the tip 31 of the locking bar to prevent outward movement of the rim. The retaining flange 13 will prevent removal of the rim in this direction.

The guide tube 4 should be securely fastened within the wheel. This may be done by securing its upper end 40 to the fixed rim 12, and by offsetting its lower end and securing it as shown at 41 to the inner disk 12. Any suitable support, however, may be employed. I prefer that the bar 3 be swelled at one or more points 32 to provide a guiding support within the tube 4, and to prevent excessive friction which would occur if the bar had a bearing throughout its length.

To project the locking bar 3 into locking engagement with the rim 2 or to retract it from locking engagement I may provide a ring 5 which is rotatable about the hub 1 of the wheel. The ring 5 may be mounted directly upon the hub and may be spaced from the disks upon their inner sides by means of the spacer sleeves 15. The ring 5 is provided with a series of inclined slots 50 which terminate at their outer ends in laterally or peripherally disposed slots which form a lateral shoulder 51. Secured in a head 33 formed upon the inner end of the rod 3 is a pin 34. This pin passes through the slots 50 and by its engagement therewith projects or retracts the rod 3 as the ring 5 is rotated. When the rod 3 has been projected to its outer limit, by turning the ring to bring the pin 34 to rest upon the shoulder 51 a positive lock is formed, and the bar 3 cannot be retracted without positively turning the ring.

A handle 52 may be secured to the ring to turn it, and access may be had to this through a door 16 provided with a latch 17 which is pivoted in the inner disk 11. A clip 45 may be secured to one of the guide tubes 4 to hold the handle 52 in its locked position.

In Figures 3 and 4 I have shown a slightly modified locking device. The locking bar 35 is pivotally secured at 36, at its inner end, to the ring 5, this ring having no slots 50. At its outer end the locking bar 35 is pivoted at 37 to a pivoted lever 6 which forms the locking dog. After the rim 2 has been placed upon the wheel the ring 5 is turned into the positions shown in Figures 3 and 4 and this causes the locking dog 6 to project into the slot 14 outside of the key 20. This will prevent the removal of the rim until the locking dog 6 has been swung out of position. A clip 38 secured directly upon the rod 35 engages the handle 52 to secure the parts in locked position. There is no need of a guide tube 4 surrounding the locking bar 35 in this type.

In Figures 5 and 6 I have shown my device as it might be employed for a single disk wheel. In this construction it is desirable that all working parts be enclosed and kept watertight. I have, therefore, shown the ring 5 as enclosed within a chamber 18 which is closed by a cap 19 screwing upon the hub 1. The guide tube 4 is screwed into the periphery of the chamber 18 and made water-tight, and at its upper end is securely held in a clip 46. I prefer that a packing gland 47 be employed at the outer end of the tube 4. In this construction I have shown the end 31 of the locking bar 3 as extending upward past a laterally facing shoulder 22 upon the outside of the key 20. The operating handle 52 is secured to the disk 5 as described in connection with the construction in Figures 1 and 2 and extends outside of the chamber 18. I prefer to form the handle 52 with a covering cap 53 which will prevent the entrance of dirt through the slot 54, through which the handle 52 operates, when the parts are in the locked position. In other respects this construction is the same as that described in connection with the double disk type of wheel, shown in Figures 1 and 2.

What I claim as my invention is:

1. The combination with a disk wheel having a closed annular chamber about its hub, and a demountable rim, of a rim locking device including a plurality of tubes extending from said chamber to the fixed rim and forming a radial guide, a locking member reciprocable in each tube and adapted to engage the demountable rim to prevent axial displacement thereof, and means positioned within said annular chamber for projecting or retracting said locking members.

2. The combination with a disk wheel having a closed annular chamber about its hub, and a demountable rim, of a rim locking device including a plurality of tubes extending from said chamber to the fixed rim and open only at their ends, a locking bar reciprocable in each tube and adapted to engage the demountable rim to prevent axial displacement thereof, a packing gland in the outer end of each tube surrounding the locking bar, and means positioned within said annular chamber for projecting or retracting said locking bars.

3. The combination with a disk wheel having an annular groove extending about its hub, a cap secured upon the hub and adapted to close the open side of said groove, and a demountable rim, of a rim locking device including a plurality of closed tubes forming radial guides extending between said groove and the fixed rim, a locking bar reciprocable in each tube and adapted to engage the demountable rim to prevent axial displacement thereof, and means within said groove for projecting and retracting said locking bars.

4. A rim locking device for wheels comprising a radially movable locking bar adapted to be projected to engage a demountable rim, a ring rotatable about the hub and having a slot therein inclined relative to a radius, and connecting at its outer end with a short peripherally-extending slot, and a follower in said slot and secured to the inner end of said bar.

Signed at Seattle, King County, Washington, this 24th day of April, 1920.

WILLIAM A. CLENCH.